United States Patent Office 3,211,554
Patented Oct. 12, 1965

3,211,554
PHOTOGRAPHIC LAYERS FOR THE SILVER DYESTUFF BLEACHING METHOD
Paul Dreyfuss, Basel, Switzerland, assignor to Ciba Corporation, a corporation of Delaware
No Drawing. Filed July 11, 1961, Ser. No. 123,092
Claims priority, application Switzerland, July 22, 1960, 8,382/60
5 Claims. (Cl. 96—99)

The silver dyestuff bleaching method for the production of photographic images depends on the fact that numerous azo-dyestuffs, with which a layer forming material, especially gelatine, is colored can be destroyed to an extent which depends on the quantity of image silver present by the action of suitable dyestuff bleaching baths by the reduction of the azo-linkage.

The present invention provides photographic layers suitable for the silver dyestuff bleaching method which are colored with an azo-dyestuff of the formula (1)

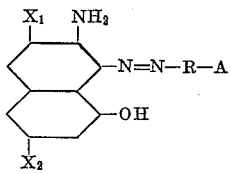

in which $X_1$ represents a hydrogen atom or a sulfonic acid group, $X_2$ represents a sulfonic acid group or sulfonic acid amide group, R represents a cyclic radical containing at least one benzene ring to which the azo-linkage is bound, and A represents an acylamino group bound to the radical R by its nitrogen atom.

As will be seen from the formula the dystuffs contain at least one sulfonic acid group. The dyestuffs molecule advantageously contains two to four acid groups imparting solubility in water, which groups include sulfonic acid groups and carboxylic acid groups. $X_1$ represents either a sulfonic acid group or advantageously a hydrogen atom. $X_2$ represents a sulfonic acid group, or it may represent a sulfonic acid amide group more especially when $X_1$ represents a hydrogen atom. $X_2$ may be an unsubsbtituted sulfonic acid amide group or a sulfonic acid amide group substituted at the nitrogen atom having the formula

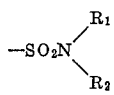

in which $R_1$ represents an alkyl radical which may be substituted, for example, by hydroxyl groups, or represents an aryl radical, especially a phenyl radical, or a cycloalkyl radical such as cyclohexyl, or an aralkyl radical such as benzyl, $R_2$ represents a hydrogen atom or an alkyl radical which may be substituted, or $R_1$ and $R_2$ may together with the nitrogen atom represent a heterocyclic radical, for example, a morpholine radical. The radical R is a cyclic radical which contains at least one benzene ring, and the azo-linkage is bound directly to the benzene ring. In addition to the acylamino group, the radical R may contain further substituents, for example, lower alkyl or alkoxy groups such as methyl, ethyl, methoxy or ethoxy, or a halogen atom such as chlorine, or a sulfonic acid or carboxylic acid group.

The acylamino group A is advantageously derived from a carboxylic acid of high molecular weight, for example, a fatty acid containing 12 to 22 carbon atoms. However, the acylamino group may be of more complex constitution by being derived, for example, from cyanuric acid, or being a benzene- or toluene-sulfonyl amino group or an acylamino group of the constitution —SO$_2$— benzene nucleus —NH—CO— alkyl radical. In general it is of advantage when the acylamino group and the azo-linkage are bound to the benzene radical in para-position relatively to one another. As examples there may be mentioned dyestuffs of the formula (2)

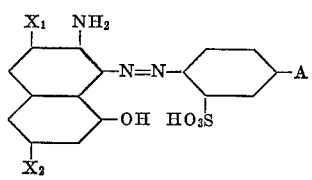

in which $X_1$, $X_2$ and A have the meanings given above.

Especially valuable dyestuffs of the formula (1) are those of which the acylamino group A contains the acyl radical of a dibasic acid, for example, dyestuffs of the formula (3)

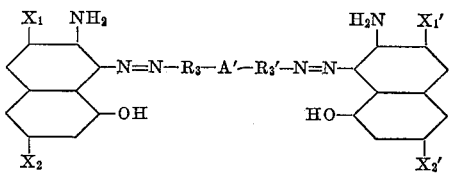

in which $X_1$ and $X_1'$ each represent a sulfonic acid group or advantageously a hydrogen atom, and $X_2$ and $X_2'$ each represent a sulfonic acid group or a sulfonic acid amide group, $R_3$ and $R_3'$ each represent a cyclic radical containing at least one benzene ring to which the azo-linkage is bound, for example, a monocyclic benzene radical bound in the meta- or para-position to the azo-linkage, and A' represents a radical of a diamide of an at least dibasic organic acid bound to $R_3$ and $R_3'$ through the nitrogen atoms.

Such dyestuffs may be asymmetrical or advantageously symmetrical like the diazo-dyestuffs of the formula (4)

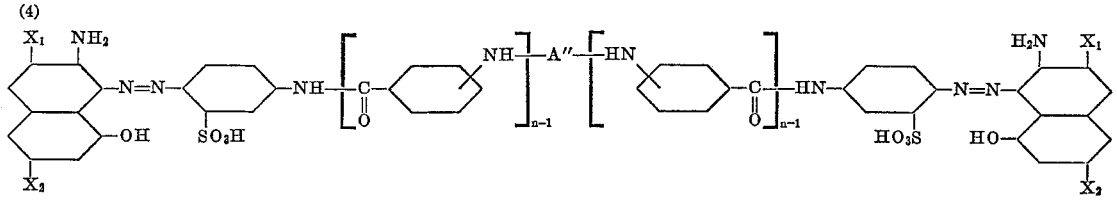

in which $X_1$ and $X_2$ have the meanings given above, $n$ represents the whole number 1 or 2, and

—NH—A″—HN— represents the radical of a diamide of a dibasic acid. Radical A' or A″ may be derived, for example, from an aromatic dicarboxylic acid, such as isophthalic acid, terephthalic acid, 1:1'-diphenyl-3:3'- or -4:4'-dicarboxylic acid, or from a heterocyclic dicarboxylic acid such as furane-2:5-dicarboxylic acid or an aliphatic dicarboxylic acid such as fumaric acid or butadiene dicarboxylic acid.

Especially valuable are those dyestuffs of the Formula 4 in which the radical —NH—A″—HN— has the formula —NH—CO—HN.

Some of the dyestuffs of the Formulae 1 to 4 are known. The new dyestuffs of those formulae can be made by methods in themselves known.

An especially advantageous method is to couple an appropriate diazo-compound of the benzene series with 2-amino - 8 - hydroxynaphthalene-6-sulfonic acid or a 2-amino - 8 - hydroxynaphthalene-6-sulfonic acid amide or 2-amino-8-hydroxynaphthalene-3:6-disulfonic acid in an acid medium.

As diazo components there are advantageously used nitroaminobenzenes, in which case a dyestuff of the Formulae 1 or 2 is obtained by reducing the nitro group and acylating the resulting amino group. The same dyestuffs can be obtained by using as diazo-compounds the corresponding monoacyl-phenylenediamine. Alternatively, the acyl radical, for example, the acetyl radical, may be split off from the monoazo-dyestuff so obtained and exchanged for another acyl radical, for example, the 4-nitrobenzoyl radical.

Diazo-dyestuffs of the Formula 4 can be made by linking together two molecules of amino-monoazo-dyestuffs in which the amino group is bound to the benzene radical by reaction with a dichloride of one of the aforesaid dibasic acids, reaction with phosgene being preferred.

Instead of the symmetrical urea derivatives obtainable with phosgene (or a mixture of asymmetrical and symmetrical urea derivatives obtainable by reacting phosgene with a mixture of amino-azo-dyestuffs), unitary asymmetrical urea derivatives of the Formula 3 [in which A′ in this case represents a —NH—CO—HN— group] may be made by way of the phenyl-urethanes obtainable from amino-azo-dyestuffs and phenyl isocyanate.

As examples of diazo-components to be used for making the dyestuffs by the methods described above there may be mentioned the following compounds:

3- or 4-nitro-1-aminobenzene,
3-methyl-4-nitro-1-aminobenzene,
4-nitro-1-aminobenzene-2-sulfonic acid,
1-amino-2-methoxy-4-nitrobenzene,
1-amino-2-methoxy-4-nitro-6-chlorobenzene,
1-amino-2-methoxy-4-nitrobenzene-5-sulfonic acid,
1-amino-2-methoxy-4-nitrobenzene-5-carbonic acid,
1-amino-2:5-dimethoxy-4-nitrobenzene,
1-amino-4-acetylaminobenzene-2-sulfonic acid and
1-amino-4-(4′-nitrobenzoylamino)-benzene-2-sulfonic acid (5)

In accordance with the invention the dyestuffs of the Formulae 1 to 4 are used for making colored photographic layers, especially gelatine layers, and also layers of other colloids used in the photographic art. These dyestuffs are used more especially for the purple image of a color photographic original or copying material, that is to say, in color negative materials or any color diapositives to be viewed by transmitted or reflected light. The layer forming material colored with such a dyestuff is mixed with a sliver halide emulsion, the silver halide is sensitized in the appropriate manner for a desired region of the spectrum and the resulting photographic layer is used, for example, as a component of a two-color or three-color system. Alternatively, a non-colored silver halide layer may be colored with the dyestuff after exposure and development, and then subjected to the dyestuff bleaching process. The color image produced by the silver dyestuff bleaching method may also be used for a transfer process or an imbibition process.

As dyestuff bleaching baths there are suitable most of the known neutral or acid, and especially the strongly acid, bleaching baths which contain a solvent for silver, such as thiourea, urea or semicarbazide, and also an alkali metal halide, such as sodium or potassium chloride, bromide or iodide or an ammonium halide. Furthermore, the known catalysts such as anthraquinone and sulfonic acids thereof or dimethyl-quinoxaline or phenazines, used in the dyestuff bleaching baths for the azo-dyestuffs generally have an accelerating action on the dyestuff bleaching process.

It has been found that layers rich in silver lead to dyestuff images having excellent flat gradations. The silver of the image not consumed in the dyestuff bleaching process is converted into silver halide in known manner by means of an oxidizing bath in the presence of an alkali metal halide, for example, potassium ferricyanide and potassium bromide or by means of an acid bath containing copper sulfate and sodium chloride. Finally the image is fixed in known manner by means of a sodium thiosulfate bath, washed and dried.

The bleaching process may be further assisted by intermediate washings, for example, the image may be bleached for 10 minutes, washed in water for 5 minutes, again bleached for 10 minutes, washed for 5 minutes and finally bleached. The addition of a water-soluble organic solvent such as an alcohol, acetone, dioxane, glycol or dextrose, can be used to assist the bleaching process.

Dyestuffs that are sparingly soluble in water are incorporated in a micro-dispersed form in the gelatine. It is of advantage to use dyestuffs which are soluble in water or in an organic solvent which, like alcohol, acetone or dioxane, can easily be washed out of the gelatine.

The occasionally blackish tints of dyestuffs that are sparingly soluble in water can be brightened by modifying the substratum, for example, by adding a small proportion of a higher polyethylene glycol to the gelatine.

The photographic images obtained with the dyestuffs of the Formula 1 are distinguished by their very good fastness to light and this property is not or is only slightly impaired by substances that inhibit diffusion, such as guanidine, biguanide or triphenyl-guanidine, in the colored layer itself or in layers adjacent thereto.

The following examples illustrate the invention the parts and percentages being by weight:

*Example 1*

3 to 5 grams of the dyestuff of the formula

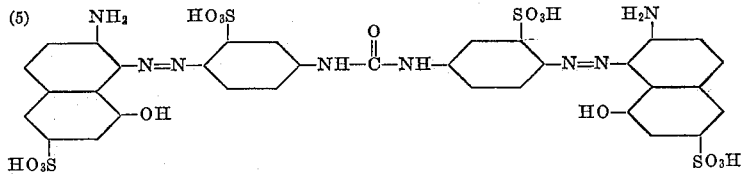

are dissolved in 600 cc. of water. The aforesaid dyestuff is known and can be produced by coupling diazotized 1-amino-4-nitro-benzene-2-sulfonic acid with 2-amino-8-hydroxynaphthaline-6-sulfonic acid in an acid medium, reducing the resulting nitro-monoazo-dyestuff to the aminoazo-dyestuff and linking together two molecules of the dyestuff at the amino groups by means of phosgene to form the urea derivative. The solution is added to 1000 grams of a green sensitized silver bromide gelatine emulsion which contains 25 to 35 grams of silver, and one of the substances inhibiting diffusion which are referred to above is added. The quantity of dyestuff and the quantity of silver bromide may vary within the aforesaid limits depending on whether a transparency or an image to be viewed by reflected light is to be made and on the thickness of the layer.

The colored silver bromide gelatine emulsion is cast on a support, that is to say, on paper or a film, as a component of a 3-layer material. After drying the layer and exposing it, the negative silver image is developed with a solution containing, per liter or water, one gram of methyl-para-aminophenol, three grams of hydroquinone, 25 grams of sodium sulfite, 40 grams of sodium carbonate, 1 gram of potassium bromide. The duration of the development is 5 to 7 minutes. The material is then washed in water for one minute, and then fixed for 5 minutes in a bath containing, per liter of water, 200 grams of sodium thiosulfate and 25 grams of potassium meta-bisulfite. After a fixing period of 5 minutes, the material is again washed with water for 5 to 7 minutes, and then the gelatine is hardened for 5 minutes in an aqueous solution of formaldehyde of 4% strength. The material is again washed for 5 minutes and then treated for 20 minutes in a silver dyestuff bleaching bath which contains in solution, per liter of water, 50 to 100 grams of potassium bromide 30 to 60 grams of thiourea, 40 to 80 cc. of hydrochloric acid of 37% strength and as a catalyst 1 cc. of a solution of 1% strength of 2-amino-3-hydroxyphenazine. The material is then washed in water for 5 minutes. The unconsumed image silver is converted into silver bromide by means of a bath containing, per liter of water, 60 grams of copper sulfate, 80 grams of potassium bromide and 30 cc. of hydrochloric acid of 37% strength, and the material is washed with water, and the silver bromdie is dissolved by treating the material for about 5 minutes in a fixing bath which contains 200 grams of sodium thiosulfate per liter of water. Finally the material is washed with water for a further 5 minutes and dried. There is obtained a reverse image having a pure purple tint of very good fastness to light.

*Example 2*

The procedure is the same as described in Example 1, except that, instead of the dyestuff of the Formula 5, there is used one of the dyestuffs given in column I of the following table. In column II is given the tint produced by the dyestuff and in column III the wave length at which the dyestuff has a maximum absorption.

| No. | I. Formula | II Tint | III λ max. |
|---|---|---|---|
| 1 | 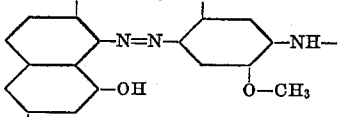 | Purple [1] | 520 |
| 2 | 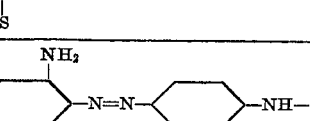 | Reddish purple. | 522 |
| 3 | 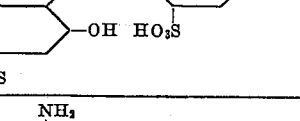 | Purple | 525 |
| 4 | 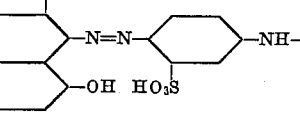 | Red | 515 |
| 5 | 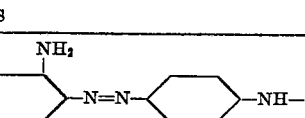 | Purple | 528 |
| 6 | 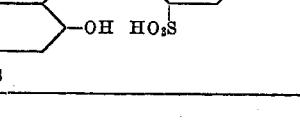 | Purple | 522 |

See footnotes at end of table.

| No. | I. Formula | II Tint | III λ max. |
|---|---|---|---|
| 7 | NH₂, OH, HO₃S naphthyl —N=N— benzene(SO₃H) —NH—SO₂— benzene —HN—C(=O)—(CH₂)₁₀—CH₃ | Purple | 525 |
| 8 | NH₂, OH, HO₃S naphthyl —N=N— benzene —SO₂—N(C₂H₅)— benzene —NH—C(triazine with two HN—C₆H₄—SO₃H substituents) | Violetish purple | 550 |
| 9 | NH₂, OH, HO₃S naphthyl —N=N— benzene(HO₃S)(HN—C(=O)—CH₃) | Red | 514 |
| 10 | NH₂, OH, HO₃S naphthyl —N=H— benzene(SO₃H)—C=C— (—NH—C(=O)— and C(=O)—NH—) linking to benzene(SO₃H)—N=N— naphthyl(HO, SO₃H, H₂N) | Purple | 530 |
| 11 | NH₂, OH, HO₃S naphthyl —N=N— benzene(HO₃S) —NH—C(=O)— benzene —C(=O)—HN— benzene(SO₃H) —N=N— naphthyl(HO, HO₃S, H₂N) | Purple | 525 |
| 12 | NH₂, OH, HO₃S naphthyl —N=N— benzene(HO₃S) —NH—C(=O)— benzene —NH—C(=O)—HN— benzene —C(=O)—HN— benzene(SO₃H) —N=N— naphthyl(HO, SO₃H, H₂N) | Purple | ²540 |
| 13 | NH₂, OH, HO₃S naphthyl —N=N— benzene(HO₃S) —NH—C(=O)— benzene —NH—C(=O)—C=C—C(=O)—HN— benzene —C(=O)—HN— benzene(HO₃S) —N=N— naphthyl(HO, SO₃H, H₂N) | Purple | 538 |

See footnotes at end of table.

| No. | I. Formula | II Tint | III λ max. |
|---|---|---|---|
| 14 | (structure) | Purple | 540 |
| 15 | (structure) | Purple | 525 |
| 16 | (structure) | Purple [3] | 518 |
| 17 | (structure) | Purple | 525 |
| 18 | (structure) | Purple | 525 |
| 19 | (structure) | Purple | 528 |
| 20 | (structure) | Purple | 535 |

See footnotes at end of table.

| No. | I. Formula | II Tint | III λ max. |
|---|---|---|---|
| 21 | 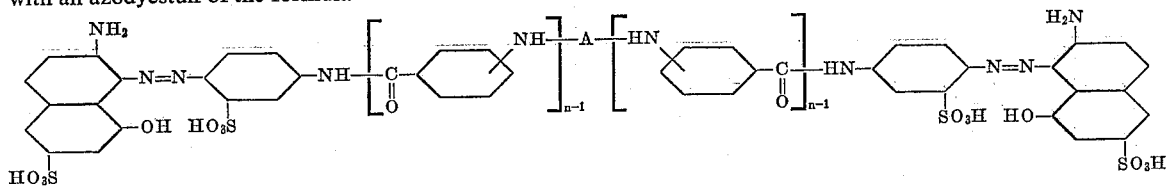 | Purple | 530 |

[1] Blackish, without a wetting agent.   [2] Also a maximum at 570.   [3] Somewhat blackish.

What is claimed is:
1. A photographic silver halide emulsion layer for the silver dyestuff bleaching process, which layer is colored with an azodyestuff of the formula

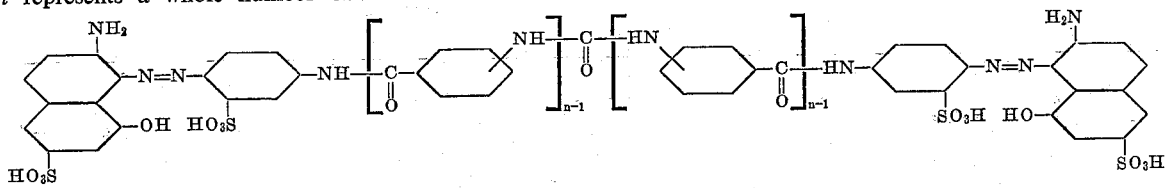

in which A represents a member selected from the group consisting of the radicals of the formulae

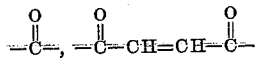

and

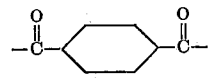

and $n$ represents a whole number of at the most 2.

2. A photographic silver halide emulsion layer for the silver dyestuff bleaching process, which layer is colored with an azodyestuff of the formula

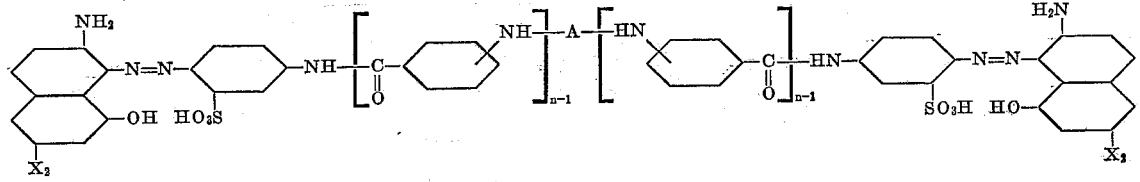

in which $X_2$ represents a member selected from the group consisting of a sulfonic acid group and a sulfonic acid amide group, A represents a member selected from the group consisting of the radicals of the formulae

and

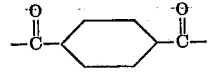

and $n$ represents a whole number of at the most 2.

3. A photographic silver halide emulsion layer for the silver dyestuff bleaching process, which layer is colored with an azodyestuff of the formula

[formula as in claim 1 without brackets structure]

in which $n$ represents a whole number of at the most 2.

4. A photographic silver halide emulsion layer for the silver dyestuff bleaching process, which layer is colored with the azo dyestuff of the formula

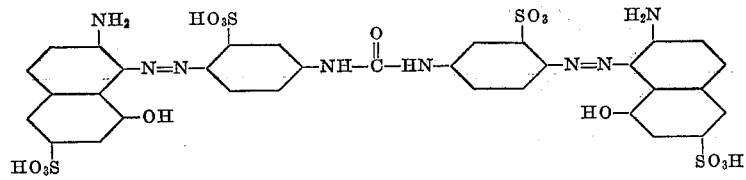

5. A photographic silver halide emulsion layer for the silver dyestuff bleaching process, which layer is colored with the azo dyestuff of the formula
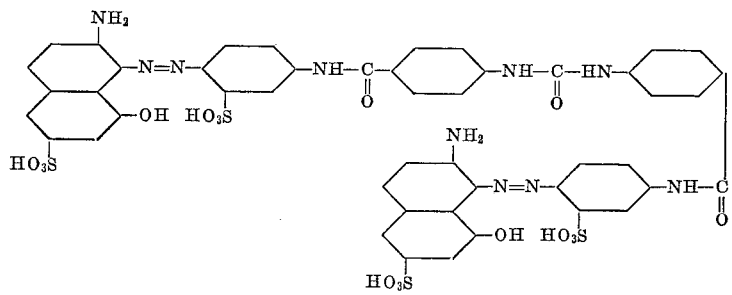
References Cited by the Examiner
UNITED STATES PATENTS
2,294,892   9/42   Carroll et al. _____ 96—99
OTHER REFERENCES
Okubo et al.: Chemical Abstracts, vol. 48, pages 10,646–7 (1954).
NORMAN G. TORCHIN, *Primary Examiner.*
HAROLD N. BURSTEIN, *Examiner.*